United States Patent [19]

Girard et al.

[11] Patent Number: 4,963,381

[45] Date of Patent: Oct. 16, 1990

[54] METHOD FOR PARTIAL OR TOTAL DEALCOHOLIZATION OF WINE AND/OR CIDER AND DEVICE FOR IMPLEMENTING SUCH METHOD

[75] Inventors: Jean-Marc Girard, Payerne; Philippe Cuenat, Nyon, both of Switzerland

[73] Assignee: Federation des Cooperatives Migros, Zurich, Switzerland

[21] Appl. No.: 96,014

[22] PCT Filed: Dec. 18, 1986

[86] PCT No.: PCT/CH86/00178

§ 371 Date: Sep. 28, 1987

§ 102(e) Date: Sep. 28, 1987

[87] PCT Pub. No.: WO87/03902

PCT Pub. Date: Jul. 2, 1987

[30] Foreign Application Priority Data

Dec. 19, 1985 [FR] France ................... 85 19097

[51] Int. Cl.$^5$ ................... C12G 3/08
[52] U.S. Cl. ................... 426/490; 426/495; 210/651; 210/652
[58] Field of Search ........... 426/490, 592, 14, 495, 426/493; 210/651, 652

[56] References Cited

U.S. PATENT DOCUMENTS

| | | | |
|---|---|---|---|
| 1,619,016 | 3/1927 | Duclaux | 210/651 |
| 4,302,476 | 11/1981 | Lunt | 426/231 |
| 4,499,117 | 2/1985 | Bonneau | 210/652 |
| 4,612,196 | 9/1986 | Goldstein et al. | 426/490 |
| 4,617,127 | 10/1986 | Light | 210/651 |
| 4,681,767 | 7/1987 | Weiss | 426/493 |
| 4,775,538 | 10/1988 | Boucher | 426/493 |
| 4,792,402 | 12/1988 | Fricker | 210/652 |

FOREIGN PATENT DOCUMENTS

| | | |
|---|---|---|
| 717847 | 12/1968 | Belgium . |
| 2339206 | 3/1975 | Fed. Rep. of Germany . |
| 3344628 | 6/1984 | Fed. Rep. of Germany . |
| 1585376 | 1/1970 | France ................... 210/652 |
| 62-11086 | 1/1987 | Japan ................... 426/592 |
| 62-61579 | 3/1987 | Japan ................... 426/14 |
| 2133418 | 7/1984 | United Kingdom . |

*Primary Examiner*—Wilbur Bascomb
*Attorney, Agent, or Firm*—Frost & Jacobs

[57] ABSTRACT

A method to dealcoholize partially or totally wine and/or cider and apparatus to implement this method. The invention aims to permit a partial or total dealcoholization of wine and/or of cider while preserving the bouquet and the aroma of the treated product.

The apparatus used comprises a vat containing the liquid to be treated, a module of reverse osmosis, and a closed circuit between these two elements to cause the liquid that is to be treated to circulate through the module and return to the tank. Mounted in this circuit are a high pressure pump and means to control and regulate the pressure, the temperature and the flow to enable the dealcoholization operation to be effected. Means are provided to inject demineralized, dechlorinated water to make up for the loss of permeate. An ingredient container is provided to mix ingredients tending to give the original bouquet and aroma back to the treated liquid. The invention is applicable to all liquids containing alcohol, particularly wine.

9 Claims, 1 Drawing Sheet

METHOD FOR PARTIAL OR TOTAL DEALCOHOLIZATION OF WINE AND/OR CIDER AND DEVICE FOR IMPLEMENTING SUCH METHOD

BACKGROUND OF THE INVENTION

This invention relates to a method to dealcoholize partially or totally wine and/or cider by using the so-called technique of reverse osmosis.

It relates also to apparatus to implement this method.

Different processes have been used to attempt to remove the alcohol from various alcoholic beverages such a wine, beer, cider, etc. Among these processes, the oldest is evaporation which leads to a product which having undergone a heat treatment, is spoiled, having a taste of "cooked" (grapes, etc.) and whose aromas were modified during the operation. In addition, these methods require a great amount of energy, so that the cost of the final product is influenced to a large extent by the consumption of energy of the installations.

Reverse osmosis to partially dealcoholize wines, consisting of passing the untreated wine through membranes to separate from this wine a permeate constituted by a mixture of water and alcohol, and of replacing the exact volume of this permeate with an equivalent volume of water, demineralized or not, has already been the subject of numerous tests described in several publications that are analyzed below.

European patent application No. EP-A-0162240 describes a process and an installation to dealcoholize alcoholic beverages by reverse osmosis. The permeate removed from the osmotic module is vacuum distilled to be dealcoholized, and then it is added to the retentate in order to give it back aromas originating in the original beverage and to reduce the injection of water. If desired, to eliminate completely any addition of water, the removed alcohol may be replaced with vacuum distilled wine added to the permeate coming out of the osmotic module.

The technique of vacuum distillation used to isolate the aromas of the permeate causes a degradation of these aromas, so that the residual substances added to the retentate never make it possible to give back to this retentate the bouquet of the original beverage.

German patent application DE-A 23 39 206 describes another method to dealcoholize wine or other alcoholic beverages by a technique using the principle of reverse osmosis. The mixture of water and alcohol removed is replaced with water, and the process provides for the addition, after the treatment, of weakly fermented fruit juices to restore a semblance of initial taste.

German patent application DE-A 23 23 094 describes also a process to dealcoholize beer by reverse osmosis. According to a principle analogous to the one described in the above-mentioned European patent application, the alcohol is removed from the permeate and this permeate is added either to the retentate, or to the original beverage prior to its introduction in the osmotic module.

The analysis of these different publications shows very clearly that one of the main concerns of all those who have tried to dealcoholize alcoholic beverages by applying a method based on reverse osmosis were confronted with the problem of deterioration of the taste and the aroma of the beverage obtained after the treatment. However, none of the approaches used in trying to solve this problem led to an acceptable result. The use of heat treatments to remove the alcohol from the permeate generates inevitably a deterioration of the bouquet and of the aroma. The addition of a controlled amount of original liquid can never restore the original taste and aroma since the reintroduced substances are too strongly diluted to transmit their characteristics to the whole volume treated, especially if in the final product a percentage of alcohol of less than 0.7% is to be preserved.

As a result, dealcoholized beverages and more specifically dealcoholized wines obtained with the methods known to this day no longer possess the qualities of taste and aroma that make them a product appreciated by the consumer.

SUMMARY OF THE INVENTION

This invention aims to correct this problem by proposing a process to dealcoholize partially or totally wine and/or cider that makes it possible to obtain a product whose taste and bouquet are better preserved.

To this end, the invention is characterized in that the liquid to be dealcoholized is stored and processed in a non-oxidizing atmosphere, that this liquid is passed through a module of reverse osmosis, that the loss of volume due to the separation of the liquid of the permeate is continually replaced with an injection of demineralized water totally free of any trace of chlorine, that to the retentate are added natural or artificial ingredients not removed from the original liquid by a heat treatment, and that the retentate thus completed is clarified and filtered, then pasteurized.

According to a particularly advantageous mode of implemention of the process, the ingredients are kept in closed containers in a non-oxidizing atmosphere.

To add the natural or artificial ingredients to the retentate, a predetermined amount of such ingredients is preferably dissolved in a predetermined volume of retentate taken from the dealcoholizing circuit, and this mixture is reinjected into this circuit.

The ingredients dissolved in the retentate are advantageously reinjected after lowering the pressure in the module of reverse osmosis below the minimum pressure required to start the process of reverse osmosis.

The ingredients used are preferably at least one of fruit juice concentrates, food acids, sugars, tartrates and tannin.

The ingredients dissolved in the retentate are reinjected into the dealcoholizing circuit preferably in the presence of sulfur dioxide ($SO_2$).

According to an advantageous mode of implementation, to obtain dealcoholized white wines or sparkling wines, a predetermined amount of carbon dioxide ($CO_2$) is injected into the dealcoholized liquid after it is clarified.

The apparatus to implement the process of partial or total dealcoholization of wine and/or cider by using the technique of reverse osmosis is characterized in that it comprises a first tank designed to contain the liquid to be processed, means to create a non-oxidizing atmosphere in the tank and in a closed dealcoholizing circuit, a module of reverse osmosis mounted in this circuit, so that the liquid circulates continuously between the tank and the module, means to continuously make up for the loss of volume due to the separation of the permeate, through an injection of demineralized water, means to remove from that water all traces of chlorine, means to mix natural or artificial ingredients not removed from the original liquid, means to add these ingredients into the retentate, and means to clarify, to filter, and to pasteurize the said retentate.

BRIEF DESCRIPTION OF THE DRAWINGS

This invention will be better understood by referring to the description of an exemplary embodiment of the device used to implement the process described and the attached drawing where.

DETAILED DESCRIPTION

Figure 1:
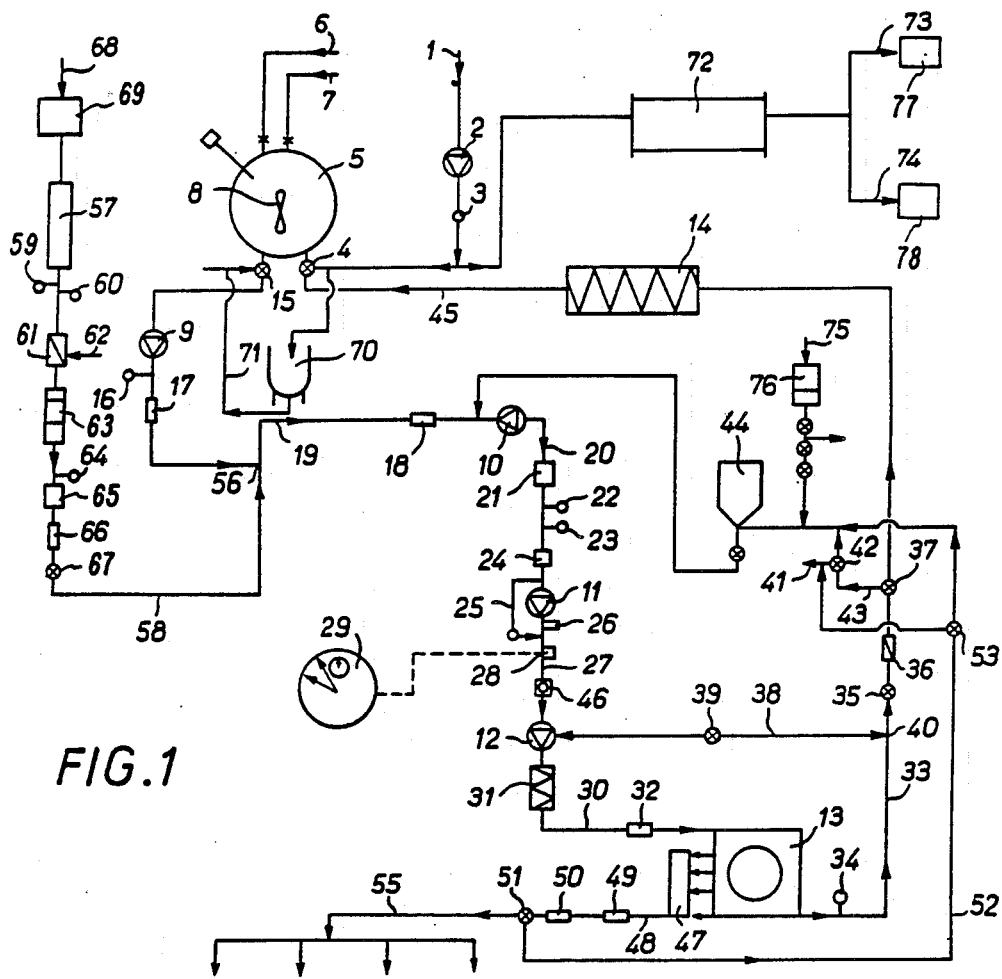
FIG. 1 shows a diagrammatic view of an installation enabling the process according to the invention to be implemented on an industrial scale.

The process according to the invention as worked industrially in the installation shown diagrammatically in FIG. 1 will be described in detail below.

It should be noted first that the wine to be processed must meet very strict quality requirements. On the one hand, it must be irreproachable from a bacteriological point of view. Acceptable are a maximum of two hundred total germs per 100 ml of liquid to be treated and a maximum of twenty yeasts per liter of liquid. The wine must be cold stabilized and clarified in the conventional manner. Clear filtering must be effected beforehand, preferably with plate filters type K10 or Steril from Filtrox ®. For transport, it is sulfite-treated with $SO_2$ in a free maximum proportion of 35 mg per liter which remains in the wine and preferably 20 mg per liter. For red wines, it is preferable to avoid tannin contents of more than 1.5 g per liter or to avoid the use of blends in which the Pinot variety is dominant.

The wine is delivered in tanks at a temperature not lower than 4° because of the tartar, and not higher than 15° C. because of the bacteriological problems.

Starting up of the dealcoholization is effected in the following manner: the wine received in 1 is pumped, by a pump 2, through a counter 3 and a 3-way valve 4, into a treatment vat 5, located in a room where the temperature is maintained naturally or artificially between 4° and 10° C. This vat can be connected alternatively to two sources 6 and 7 of non-oxidizing gases which are preferably nitrogen ($N_2$, used for red wines) and carbon dioxide ($CO_2$ used for white wines). Prior to the introduction of the wine in the vat 5, this vat is saturated with either one of the non-oxidizing gases, to create a non-oxidizing atmosphere, at a set pressure, in the vat and in the entire processing enclosure. The vat comprises in addition a stirring device 8, of the slow type, located at the bottom of the vat to provide regular stirring of all constituents of the dealcoholized wine during and after the treatment.

When all the wine to be treated has been pumped into the treatment vat 5, the 3-way valve 4 is closed so as to proceed with the draining of the pipes of the installation. This installation comprises, in addition to the vat 5, pumps 9, 10, 11, 12, the role of which will be explained later, a module of reverse osmosis 13, and a plate heat exchanger 14, for example an exchanger sold under the trademark "Unipectine R". To drain the pipes, the pumps 11 and 12 are disengaged, the pump 11 being a high pressure pump, and the pumps 9 and 10 are engaged. In addition, a 3-way valve 15, connected to the vat 5, is actuated, to open the pipe connecting the vat to the pump 9. A pressure gauge 16 permits controlling the pressure at the output of the pump 9 and a flow-meter 17 permits controlling its discharge. A warning probe 18, mounted on the pipe 19 connecting the pump 9 to the pump 10, permits drawing attention to the absence of product and to sound an alarm to inform the operator of this condition or to automatically stop the installation.

A length of conduit 20 located between the pump 10 and the pump 11 comprises a filter 21 to collect the dirt accumulated in the circuit, a pressure regulator 22 adapted to pressures in the 0 to 4 bar range, a thermometer 23 and a thermostat 24 that can sound an alarm at temperatures exceeding a threshold fixed for example at 45° C. A bypass 25 permits working around the high pressure pump 11 with which a fluctuation damper 26 is associated. On a pipe 27, located between the high pressure pump 11 and the pump 12, a pressure control probe 28 is mounted, associated with a pressure regulator 29, of known type.

A length of conduit 30, located between the pump 12 and the module of reverse osmosis 13, comprises a cooler 31 consisting of a heat exchanger and a safety device 32 designed to control the pressures at the inlet of the module 13.

A return circuit 33, on which the plate exchanger 14 is mounted, comprises essentially a pressure gauge 34, located at the exit of the module 13, an electromagnetic valve 35 regulating the pressure in the module 13, a rotameter 36 that permits the optical control of the retentate circulating in the return circuit 33, and a manual valve 37 whose role will be explained later. A bypass 38 on which a manual valve 39 is mounted is connected between the pump 12 and a point 40 of the return circuit 33 to provide a sufficient return flow to the vat 5. The valve 39 is used during the draining operations of the circuit.

To effect this draining, the pumps 11 and 12 are stopped, the valve 39 is closed and the wine coming from the vat 5 is directed by the pumps 9 and 10 through the bypass circuit 25 into the osmotic module 13, then through the plate exchanger 14 in the direction of the valve 4. The rinsing water that was present in the pipes is discharged to a sewer by valve 4. The valve 39 will not be reopened before the end of draining.

Draining and starting up are complete when the pure wine, not mixed with rinsing water, appears in a sight glass of the valve 4. At that moment the dealcoholizing circuit is drained of its water.

Then the pumps 11 and 12 are engaged and the bypass circuit 25 is closed, so that the wine is forced to pass into the pump 11 where it is put under a pressure in the 35 to 40 bar range necessary to implement the process of dealcoholization by reverse osmosis. This pressure, indicated as a target value, is regulated by means of the probe 28 and kept constant by the regulator 29. Different safety devices such as the alarm probe 18 indicating a possible absence of product, the pressure safety 32, electronic rotameters or thermal probes such as the probe 46 permit obtaining an automatic operation of the installation.

During the dealcoholization, the pressure of nitrogen or of carbon dioxide in the circuit and in the vat can be adjusted by means of two pressure controllers (not shown) so that the amount of gas dissolved in the wine to be treated is kept constant.

The plate exchanger 14 which constitutes a cooler is supplied with cold water at 5°–10° C. A temperature of less than 5° C. would risk formation of a congelation of the retentate when the residual percentage of alcohol becomes low.

The module of reverse osmosis 13 used has approximately 19 m² of membrane area and is loaded preferably with cellulose acetate membranes or membranes of synthetic material, the latter offering the advantage of allowing cleaning with harsher chemical products such as for example nitric acid ($HNO_3$) in case unwanted tastes appear in the wine.

The wine to be dealcoholized circulates continuously in the dealcoholizing circuit described above between the vat 5 and the module 13 until the time when the desired degree of alcohol is reached in the retentate. The permeate, consisting of a mixture of alcohol and water, separated by the module of reverse osmosis 13, is discharged through a collecting tube 47 into a tube 48 on which are mounted an electronic rotameter 49, a check valve 50 and a 3-way valve 51. This permeate can be discharged directly into a sewer 41 through a pipe 52 and a 3-way valve 53. It can also be branched into tanks 54 through pipes 55 connected to the 3-way valve 51. The vats 54 are designed to collect the permeate depending on its degree of alcohol, for example, for use in manufacturing vinegar. The check valve 50 serves to maintain a slight overpressure at the output of the permeate, in order to avoid decarbonizing of the wine and to preserve as much as possible its organoleptic qualities. To make up for the loss of volume due to the removal of the permeate, demineralized water is injected continuously into the dealcoholizing circuit, water that is introduced into the circuit at a point 56 and which comes from a tank of demineralized water 57 after having passed through a length of conduit 58 comprising a counter 59, a manual valve 60, a rotameter 61 connected to an inlet 52 of water from the water system, filters 63, a pressure gauge 64 to control the pressure of the water in the circuit, a check valve 65, an electronic rotameter 66 and an electromagnetic valve 67. The demineralized water contained in the tank 57 comes from a source 68 and passes through a demineralizing device 69. The filters 63 are specially adapted for the removal of chlorine which gives to the demineralized wine a musty taste and they are also designed to effect a sterile filtration of the demineralized water. The function of the electronic rotameters 66 and 49 is to compare the respective flows of the permeate and of demineralized water and they actuate the valve 67 depending on the results of that comparison to ensure an exact making up for the loss of permeate, by the introduction of demineralized water. If necessary, the valve 67 can be operated manually, for example for cleaning or to bring about a concentration of the treated liquid. A display board (not shown) is provided for the instantaneous display of the flows and of the total amounts of permeate discharged and of demineralized water used, or for the display or other parameters such as for example the operating time of the system, the regular readings of the pressure gauges, of the thermometers and of the counters. Through the rotameter 61, a very small amount of water from the mains, for example nine liters per hour for a flow of dimineralized water of 0.5 m³ per hour, is introduced into the circuit to assure a correct operation of the electronic rotameter 66 which operates on the basis of a measured value of inductivity.

As an example, an installation, comprising a module of reverse osmosis with 19 m² of membrane area, was used to treat 683 liters of white wine at 11.5% of alcohol. In 5 hours of treatment the alcohol content was reduced to 0.5%. The dealcoholizing pressure present in the module 13 was 32 to 33 bars. The carbon dioxide pressure in the treatment vat varied between 0.8 and 0.9 bar. The temperature of the wine during the dealcoholizing operation was on the order of 10° C. The hourly flow of the permeate was 230 liters per hour at the start, 440 liters per hour after 2 hours of operation of the installation and 560 liters per hour at the end of the treatment. Discharged through the valve 51 were 760 liters of permeate at 6% of alcohol and 1400 liters of permeate at 1.8% of alcohol. During the operation, 2200 liters of diafiltration water were used.

As mentioned earlier, the dealcoholized wine is rearomatized with various ingredients prior to being clarified, filtered and preferably pasteurized before it is delivered in bulk or in bottles. The comparison of the displayed total amounts of diafiltration water and of permeate removed gives, with the known number of liters of wine contained in the vat at the beginning of the treatment, the number of liters of dealcoholized wine remaining in that vat after the treatment. This amount will serve as a basis for the calculation of the amount of ingredients to be introduced in the retentate. These ingredients are mixed in one or more basins 70 and can be injected, in a manner described later, into the vat 5 through the valve 15.

When the wine has reached the desired degree of alcohol, the dealcoholizing pressure in the module is reduced by acting on the regulator system 29, the two pumps 11 and 12 are stopped and the valve 60 feeding the demineralized water is closed. The valve 39 is closed to prevent the wine from flowing into the conduit 38 without circulating in the module 13.

By means of the 3-way valve 4, the amount of dealcoholized wine just necessary to dissolve a predetermined amount of ingredients is introduced into the ingredient container 70 which has a capacity on the order of 100 to 200 liters. This container can be if necessary a closed vat containing an atmosphere of non-oxidizing gas at a given pressure. The mixture is then sucked up by the pump 9 and injected through the valve 15 into the normal dealcoholizing circuit, i.e. through the osmoser and returned to the treatment vat 5. The addition of the ingredients can be effected in several steps, so that each load of ingredients is directed with its juice into the treatment vat 5 prior to taking a new amount of liquid in that vat 5, and to introducing it in the ingredient container 70 to dissolve a new load of ingredients. To prevent oxidation, a fixed amount of sulfur dioxide is injected preferably at the time of dissolution of the ingredients in the container 70.

During the process of introduction of the ingredients into the circuit, the pumps 9 and 10 alone are operating. The pumps 11 and 12 are stopped and the wine flows through the circuit 25. This way, there is not sufficient pressure in the module to cause a reverse osmosis and the ingredients are neither damaged, so that they preserve their aromas, nor discharged into the permeate.

As an example, to 1000 kg dealcoholized wine at 0.5% alcohol were added 0.4% food acids, 2.8% sugar, and 3.5% fruit juice concentrate. To increase the wine taste, it is possible to add about 0.5 g per liter of natural wine or fruit aromas as well as a maximum of 0.2% tartrates and 0.03% tannin. Stirring of the reconstituted wine is effected in the vat with an agitator 8. The dealcoholized wine must then be bottled or filtered in a sterile circuit, at the latest within two days following its dealcoholizaiton or its reconstitution. The clarified wine is discharged through the valve 4 in the direction of a plate filtering device 72 to an outlet 73 that may be intended for bulk delivery to a container 77, or an outlet 74 that leads to a carbonation, a pasteurization or a bottling means 78.

To drain the wine from the pipes at the end of the dealcoholization, rinsing water is introduced through the valve 15 which removes the dealcoholized wine contained in the circuit and the reverse osmotic module, until in the sight of the valve 4 water appears in which there is no wine. The valve 39 is then opened to permit the final draining of the pipe 38.

When water appears in the sight glass of the valve 4, the valves 4 and 15 are disconnected and it is possible to clean separately with chemicals the tubes and the module of reverse osmosis according to the directions of the manufacturer of the module. To this end the rinsings are discharged to the sewer in 41 through the manual valve 37 and a second manual valve mounted on a tube 43 connected to the rinsing circuit comprising a vat 44 commonly called CIP (cleaning in place).

The water used for the cleaning and disinfecting operations of the module and of the tubes is water from the mains supplied by a source 75 and that has passed through an activated charcoal filter 76. This water is dechlorinated to a value of less than 0.01 mg per liter of free chlorine in order to avoid musty tastes and cork tastes in the wine. This filter is capable of providing a flow of treated water on the order of 5 m$^3$ per hour.

The wine dealcoholized to the desired degree, with addition of the chosen ingredients, is preferably designed to undergo a pasteurizing heat treatment. It is clarified beforehand with a mixture of Bentonit-Nacalit ®, then filtered clear for example by means of filtering plates. After that there can be added 1.5 to 2 g carbon dioxide per liter of white wine and 4 to 6 g carbon dioxide per liter of sparkling wine to make up for the losses of $CO^2$ during the clarifying operations, independently of the other ingredients introduced before. Filtering will be done preferably with a counter-pressure if the wine contains carbon dioxide.

The dealcoholized and reconstituted wine can also be pasteurized directly in the bottle. To this end, it is maintained for about twenty minutes at a temperature of 65° to 68° C. for wine at 0.5% of residual alcohol. For wines having 4% of alcohol or more, thirty minutes at a temperature of 50° to 55° C. are sufficient. Sterile bottling of the wine can replace pasteurization. However, this operation is extremely costly in capital investment. To assure a good equilibrium of the dealcoholized wine, a time of repose on the order of three weeks at a temperature of 10° to 15° C. must be provided before it is consumed. Wines treated in this manner keep without any bacteriological or chemical problem for at least twelve months.

Figure 2:
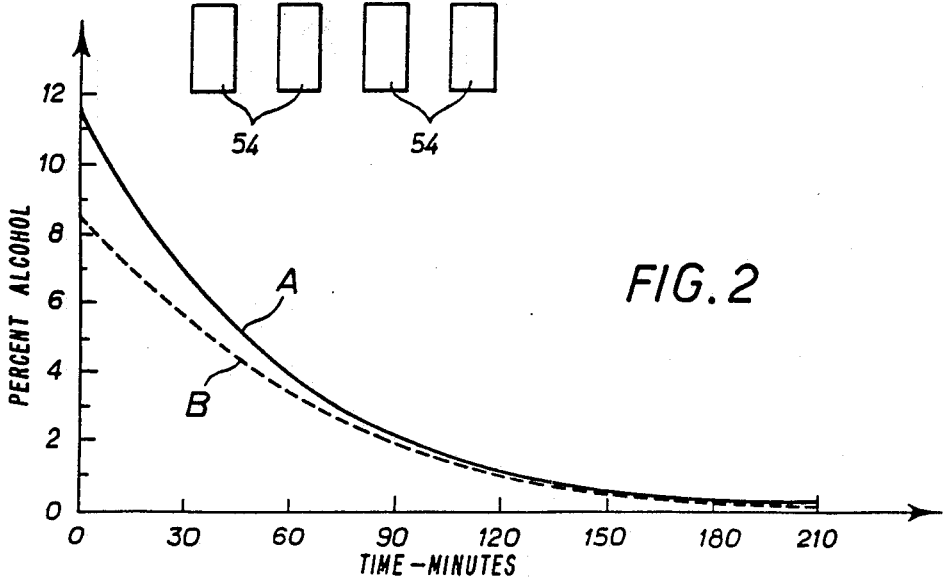
FIG. 2 shows the dealcoholizing curve of a liquid to be processed as a function of the processing time.

The curves A and B of the FIG. 2 illustrate respectively the transfer of the alcohol of the wine into the permeate during a treatment effected under the above-described conditions. The curve A, drawn in a continuous line, shows the degree of alcohol contained in the wine in relation to the length of the treatment to dealcoholize it. The curve B, drawn in broken line, shows the degree of alcohol of the permeate depending on the length of the treatment to dealcoholize the wine. In this figure, the values in the Y-axis represent the percent of alcohol and the values in the X-axis represent the minutes of treatment.

It will be understood that this invention is not limited to the forms of embodiment described, but can undergo various modifications and be implemented in the form of numerous variants which are obvious to the expert.

We claim:

1. A process to dealcoholize partially or totally an alcoholic liquid, by reverse osmosis, wherein the liquid to be dealcoholized is stored and processed in a dealcoholizing circuit in a non-oxidizing atmosphere; said liquid also containing water and original ingredients is passed through a module of reverse osmosis to obtain a permeate and a retentate, the permeate containing alcohol and water and the retentate containing the remaining original ingredients; the loss of volume due to separation of the permeate from the retentate is continually made up for with an injection into said retentate of demineralized water totally free of any trace of chlorine; natural or artificial ingredients not derived from the original liquid are added to the retentate; and the retentate thus completed is clarified and filtered, then pasteurized.

2. A process according to claim 1, wherein the ingredients are kept in closed vats in a non-oxidizing atmosphere.

3. A process according to claim 1, wherein a predetermined amount of ingredients is dissolved in a predetermined value of retentate taken from the dealcoholizing circuit, and this mixture is reinjected into said circuit ahead of said module of reverse osmosis, said module being maintained under super atmospheric pressure.

4. A process according to claim 3, wherein the ingredients dissolved in said retentate are reinjected after said super atmospheric pressure in said module of reverse osmosis has been lowered to a value below the minimum pressure required to start the process of reverse osmosis.

5. A process according to claim 4, wherein the ingredients dissolved in said retentate are reinjected during several successive phases, each type of ingredient being dissolved beforehand in a predetermined amount of retentate, and successively introduced into the retentate.

6. A process according to claim 1, wherein the ingredients are fruit juice concentrates, food acids, sugars, tartrates, or tannin, and mixtures thereof.

7. A process according to claim 3, wherein said ingredients dissolved in said retentate are reinjected into the dealcoholizing circuit with sulfur dioxide contained in the original alcoholic liquid.

8. Apparatus to carry out a process of partial or total dealcoholization of wine and/or cider by using the technique of reverse osmosis, comprising a first tank designed to contain liquid to be processed, means to create a non-oxidizing atmosphere in said tank and in a closed dealcoholizing circuit, a module of reverse osmosis mounted in said circuit in such manner that said liquid circulates continuously between said tank and said module, means to remove a permeate from said module, separate means to remove a retentate from said module whereby said permeate and said retentate are separated, means to continuously make up for the loss of volume due to the separation of permeate, through an injection of demineralized water into the retentate, means to remove from said water any trace of chlorine, means to mix natural or artificial ingredients not derived from the original liquid, means to add these ingredients into a retentate, and means o clarify, means to filter, and means to pasteurize said retentate.

9. Apparatus according to claim 8, including means to take an amount of retentate sufficient to dissolve ingredients contained in an ingredient container and means to suck up the mixture of ingredients dissolved in said retentate and reinject it into said dealcoholizing circuit.

* * * * *